United States Patent [19]

Heinz et al.

[11] Patent Number: 4,816,950
[45] Date of Patent: Mar. 28, 1989

[54] MAGNETIC STRUCTURE FOR SUPPRESSING MAGNETIC CROSS TALK AMONG ROTARY TRANSDUCERS ON A COMMON ROTARY DISC

[75] Inventors: Richard Heinz, Muhltal; Willi Hartmann, Brombachtal; Hartmut Willmann, Gross-Zimmern; Josef Walter, Reinheim, all of Fed. Rep. of Germany

[73] Assignee: Robert Bosch GmbH, Stuttgart, Fed. Rep. of Germany

[21] Appl. No.: 68,844

[22] Filed: Jul. 1, 1987

[30] Foreign Application Priority Data

Jul. 5, 1986 [DE] Fed. Rep. of Germany ....... 3622683

[51] Int. Cl.$^4$ .......................... G11B 5/10; G11B 15/60
[52] U.S. Cl. ..................................... 360/128; 360/84; 360/95; 360/130.23
[58] Field of Search .............. 360/128, 130.22, 130.23, 360/84, 85, 95, 124, 125, 130.24

[56] References Cited

U.S. PATENT DOCUMENTS

| | | | |
|---|---|---|---|
| 3,683,515 | 8/1972 | Kosaka | 179/100.2 |
| 3,806,902 | 4/1974 | Drees et al. | 360/129 |
| 4,603,360 | 7/1986 | Fujiki et al. | 360/84 |
| 4,609,947 | 9/1986 | Yamagiwa et al. | 360/84 X |
| 4,636,902 | 1/1987 | Dalziel et al. | 360/128 |

Primary Examiner—John H. Wolff
Attorney, Agent, or Firm—Frishauf, Holtz, Goodman & Woodward

[57] ABSTRACT

A strip of easily magnetizable material of low remanence, having magnetic properties equal to or better than those of the core of the magnetic heads on a revolving headwheel of a video tape machine is provided as a magnetic shunt for each head, disposed in the neighborhood of the core gap, but spaced therefrom at a distance much greater than the gap width, for reducing the spread of stray flux when the head is used for recording and intercepting stray flux from other heads when the head is in the playback mode. Among the many ways in which the shunt can be provided are individual bridge strip mounted on the headwheel to bridge over each head laterally, a horseshoe-shaped strip covering the annular gap in which the headwheel revolves for the portions of that gap over which the tape passes, but spaced away from the tape, and strips mounted on the stationary guide drums or embedded in the headwheel periphery. The reduction and interception of stray flux is of important advantage when a tape reading head is in operation at the same time as a recording head on the same headwheel.

13 Claims, 5 Drawing Sheets

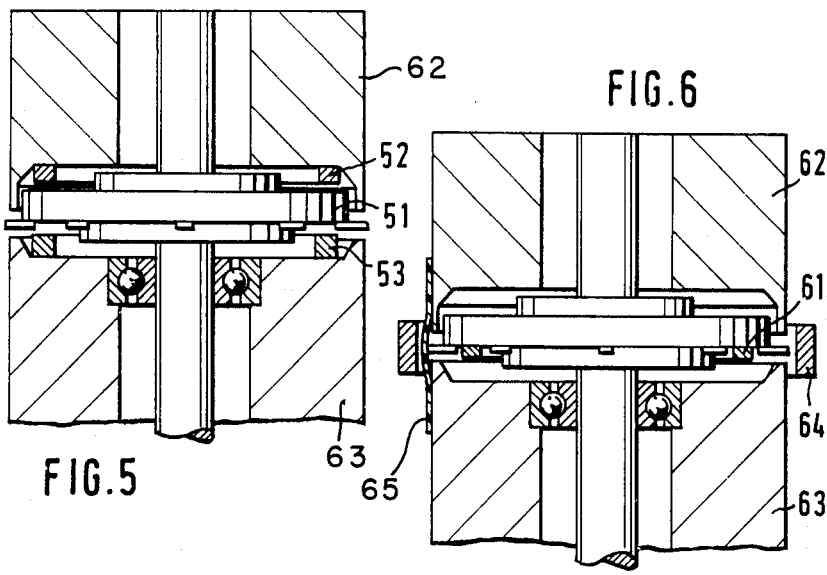
FIG. 5
FIG. 6
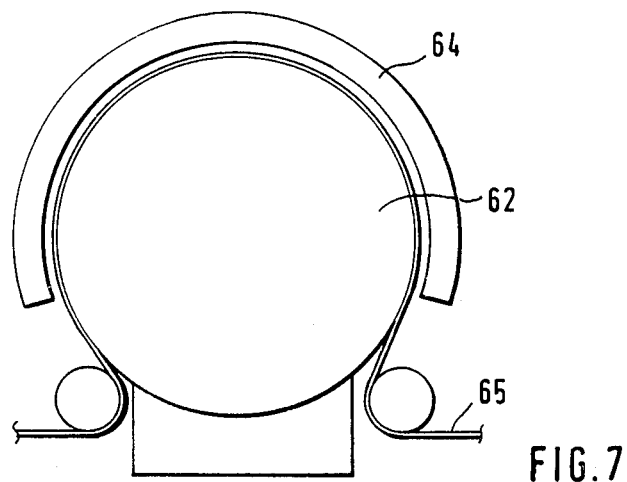
FIG. 7

MAGNETIC STRUCTURE FOR SUPPRESSING MAGNETIC CROSS TALK AMONG ROTARY TRANSDUCERS ON A COMMON ROTARY DISC

This invention concerns suppression of magnetic cross talk between transducers of a rotary multiple magnetic head device of a recording and/or playback apparatus for magnetic tape records in which a rotary disc carrying a plurality of electromagnetic transducer heads distributed around its periphery and mounted thereon rotates in a ring gap between drum shaped guide bodies for guiding the tape so that the transducers will scan the tape obliquely as the tape is passed over the guide drums.

More generally, electromagnetic transducers are used for recording information on magnetic tape which have essentially closed ring or loop cores of a material of good magnetic conductivity easily magnetizable (i.e. good permeability) and of low remanence around which a signal coil is wound on at least one portion of the core. The magnetic core loop or ring is also interrupted at a location which is in direct contact with the magnetic record, for example, a tape, so that the magnetic flux circulating in the core loop will produce a stray field at this point which penetrates the magnetic tape for writing onto the tape, so that the signal alternating currents passing through the signal coil will record a continuing track of alternating magnetization on the tape.

Conversely, in scanning the tape thus written, a magnetic flux is produced in the scanning core loop which in turn produces signal voltages in a signal coil around the core legs which represent a timewise reproduction of the magnetized regions present on the tape and make possible reconstruction of the signal voltages provided to similar signal coils during the writing process.

For data storage purposes, fixed magnetic head dispositions are known for writing or reading tracks that lie densely ajacent to each other on the tape. Such apparatus involve parallel magnetic transducer arrangements lying narrowly adjacent to each other and having a parallel reading and writing gaps. In particular for arrangements of magnetic heads that are respectively equipped for writing and for thereafter reading what has just been written, so that writing end reading heads are closely adjacent, a problem of crosstalk occurs to an increased degree. Such a magnetic head arrangement is known for example from DE OS No. 23 22 910 and U.S. Pat. No. 3,806,902, in which between the writing gap and the reading gap a transverse shield extends which consists of a magnetically highly permeable material and, furthermore, the arrangement on the writing side has a lateral shield of highly permeable material outside of the writing gap, in order to collect the stray line of force that come out of the writing gap and thereby to keep them away from the signals read in the reading gap. Furthermore, another pair of shields of highly permeable material is provided that extends between the lateral shield and the transverse shield so as to constitute in totality a shield collecting stray magnetic currents.

In further development of the known magnetic head system just described, a lateral shield is provided on the reading side in the neighborhood of the reading gap which is constructed in a manner similar to the shield on the writing side, for reducing the influence of the stray field on the writing side or of other disturbing fields operating on the magnetic circuit of the reading head. These shielding measures for known magnetic head arrays, constituted in the manner above described, are disclosed only in connection with fixed magnetic heads. For purposes of video recording, where substantially smaller magnetic heads are used on the periphery of a head wheel revolving at high speed, the known shielding measures are not usable.

It is also known, for example from U.S. Pat. No. 3,683,515, to reduce crosstalk between a writing and a reading transducer by coupling out a fractional signal from the writing signal and superimposing this on the read-out signal at a suitable amplitude and phase. In that way, a considerable extinction of the crosstalk produced by the writing signal results, but only in a limited frequency range. For this reason, this electrical type of suppression of crosstalk is not readily usable in broadband systems and it is also expensive and must be readjusted with every change of the magnetic properties of the magnetic heads that are electrically coupled to each other.

SUMMARY OF THE INVENTION

It is an object of the present invention to provide means for crosstalk reduction between magnetic transducer heads mounted on a revolving disc.

Briefly, a magnetic transducer head is provided with a magnetic shunt for reducing the spread of stray fields. According to the invention it is it not necessary to shield one magnetic transducer head completely from another so long as a magnetic shunt is provided for collecting the stray fields and diverting them to a great extent in such a way as not to pass through other magnetic transducers. The magnetic shunt is a form of a strip of easily magnetizable material of low remanence, such as ferrite, amorphous iron or mu-metal, for example, and extends in a principal direction which is parallel to the polished surface of the transducer producing the stray fields, or, more precisely, parallel to the chord of the polished surfaces, which means perpendicular to the plane of the working gap of the transducer. Preferably it has a length not less than twice the length of the polished surface of the transducer and is spaced from the transducer by a distance much greater than the width of the working gap of the transducer.

The invention has the advantage that it is effective over the entire frequency range of the magnetic transducer. Furthermore, its effectiveness is not influenced by changes in the properties of the magnetic transducers resulting from operating conditions or aging.

Although the invention is unusable for reducing crosstalk in many kinds of equipment where a plurality of magnetic heads are mounted close together or on a common support, it has the great advantage that it can be used for magnetic transducers on the periphery of a rapidly rotating head wheel for scanning a magnetic tape. The magnetic shunt for one or more transducers may be mounted on the head wheel or it may be provided as part of the guide bodies (usually of drum shape) for the magnetic tape, particularly as a part adjacent to the ring gap between the guide bodies in which the head wheel and its magnetic transducers revolve.

BRIEF DESCRIPTION OF THE DRAWINGS

The invention is further described by way of illustrative example with reference to the annexed drawings, in which:

FIG. 5 is a sectional view, partly in side elevation, of an embodiment of the invention built into the tape scanning equipment of a video recorder/player;

FIG. 6 is a sectional view like FIG. 5 of another embodiment of the invention;

FIG. 7 is a top view of the embodiment shown in FIG. 6;

THE CROSSTALK PROBLEM IN VIDEOTAPE MACHINES

Figure 1:
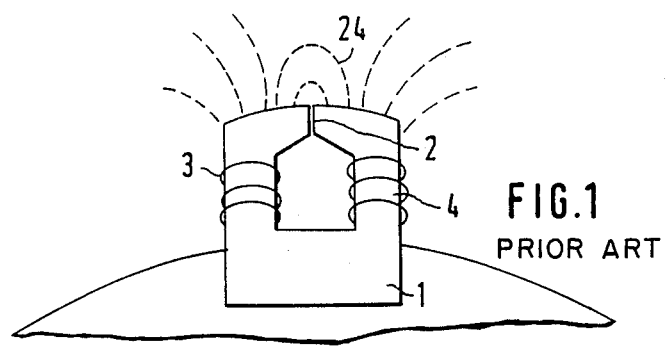
FIG. 1 is diagram of an ordinary electromagnetic video transducer, hereinafter referred to as a magnetic head, mounted on portion of the periphery of a revolving disc.

Video tape machines that record by the oblique track principle have been known a long time. The magnetic tape passes helically around a scanning device that is mostly of cylindrical cross-section (i.e. a pair of guide drums) inside which there is arranged the axis and drive for a headwheel which rotates in a slot between fixed cylinders (drums) and which is made to revolve rapidly by a motor. According to the pitch of the tape loop around the scanning device, one, two or more magnetic heads are fastened on the periphery of the headwheel for scanning the tape and either recording signals or picking them up from the tape.

In known video tape machines with several magnetic heads on the circumference of the headwheel, the helical envelopment angle of the tape about the scanning device is generally so selected that the magnetic heads alternately scan the tape and transfer signals in uninterrupted sequence. In the case of recording operations, all of the heads are in general supplied simultaneously with writing current. Crosstalk from one magnetic head to another is therefore without consequence on account of the identical nature of the signal voltage or of the signal current in all heads. In playback operation, the magnetic heads which at any time are not in contact with the tape, are separated from the playback circuits in order to reduce noise voltages, so that crosstalk from one magnetic head to another is likewise without consequence for signal quality.

In more recent video tape machines for oblique track recording and playback, however, a multiplicity of magnetic heads is provided around the circumference of the headwheel which among other things serve the purpose of reading out the information just after it is recorded for checking the recording. Furthermore, for increasing the useful bandwidth of the apparatus as a whole, two or more neighboring magnetic heads may be used for simultaneous recording or reading out of different information. In the case of post-recording and checking, the recording voltages for the magnetic heads are of the order of magnitude of one or a few volts, while the playback voltages, in contrast thereto, are of the order of millivolts. Even slight crosstalk from the magnetic heads used for recording to those used for reading out can disturb the signal that is read out. If, for example, crosstalk values in the playback signal are required to be below $-40$ dB, the result is that the degree of coupling between the two heads must be below $-100$ dB.

In the case of magnetic tape machines in which neighboring magnetic heads simultaneously write different information in order to raise the useful band width, the crosstalk problem arising from the close physical proximity of magnetic heads operating concurrently is of such a magnitude as to call for special precautions.

The invention therefore has the object of providing means for suppression of magnetic crosstalk for a multiplicity of magnetic heads arranged on the circumference of a headwheel.

DESCRIPTION OF THE ILLUSTRATED EMBODIMENTS

FIG. 1 schematically shows a known magnetic head such as is commonly used as a video magnetic head for picking up or recording broadband signals. The magnetic head comprises a magnetic core 1 made of a magnetizable material such as ferrite, for example. The magnetic loop of the core is interrupted by a working gap 2, so that when induction of the core 1 by means of the signal coils 3, 4 wound on both legs of the core takes place, lines of force extend out from the core. These outwardly extending lines of force extend, as shown, in large part from one pole to the other (from one side of the gap to the other) and magnetize the tape in a desired way. A portion of the lines of force 24 disperse more widely into the space and can pass through a neighboring magnetic head and later induce an undesired signal voltage in the signal coils that are likewise present there (FIG. 3).

Figure 3:
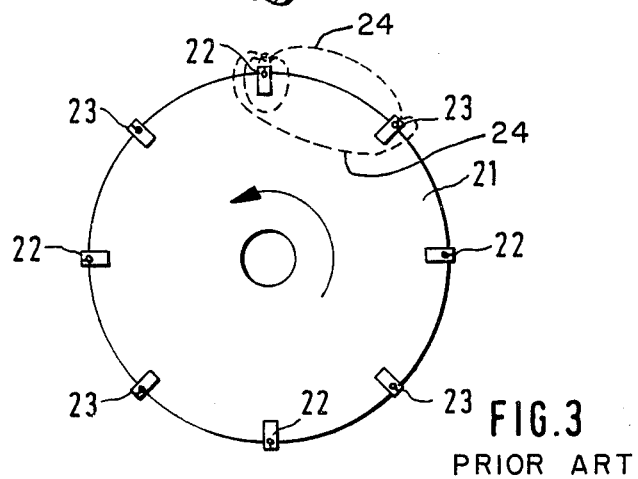
FIG. 3 is a diagram, viewed along the axis of the headwheel, of an arrangement of eight magnetic heads, of the kind shown in FIG. 1, on the periphery of a headwheel; headhweel of FIG. 2 built into the scanning apparatus of a video tape recorder/reproducer.

A top view of a conventional headwheel 21 is shown in FIG. 3 with several magnetic heads 22, 23 fixed equidistantly around its circumference. Each of these magnetic heads may have the configuration of the head illustrated in FIG. 1.

For further explanation, it is assumed that each of the magnetic heads 22 is connected for a writing operation and each of the magnetic heads 23 for read-out. As can be seen in FIG. 3, the lines of force coming out of the magnet head 22 produce a field in a region in which there lies also a magnetic heads 23 connected for read-out service, which is undesirably affected by the stray field 24. The other magnetic heads 23 are also exposed to this influence, but for reasons of simplifying the drawing, lines of force leading thereto are omitted.

Figure 2:
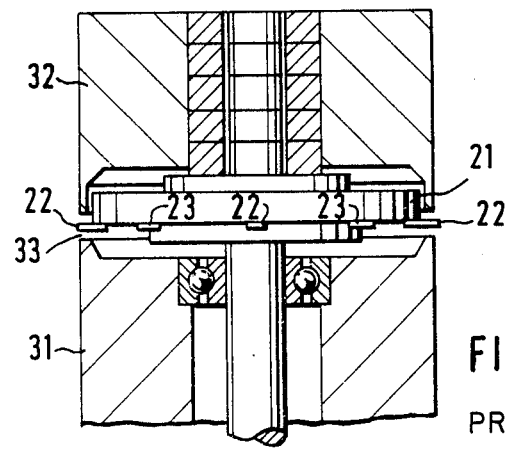
FIG. 2 is a diagram, partly in section, showing the headwheel of FIG. 2 as conventionally built into the scanning apparatus of a video tape recorder/reproducer.

FIG. 2 shows the headwheel structure of FIG. 3 built into a conventional scanning device of the guide drum type. The headwheel 21 with the magnetic heads 22, 23 is rotatably mounted in a scanning device which consists of a lower guide drum 31 and an upper guide drum 32, with an annular gap 33 between them in which the headwheel 21 rotates and in a known way scans, from the inside, a magnetic tape advancing over and around the guide drums 31, 32. Both of the drums 31 and 32 of the scanning device can be fixed, but it is also possible for one of the guide drums 31, 32 or even both of them to rotate with the headwheel or independently of it. The material of the scanning device comprising the drums 31 and 32 has heretofore been selected exclusively according to machining and mechanical qualities and not with regard to any magnetic properties.

Figure 4:
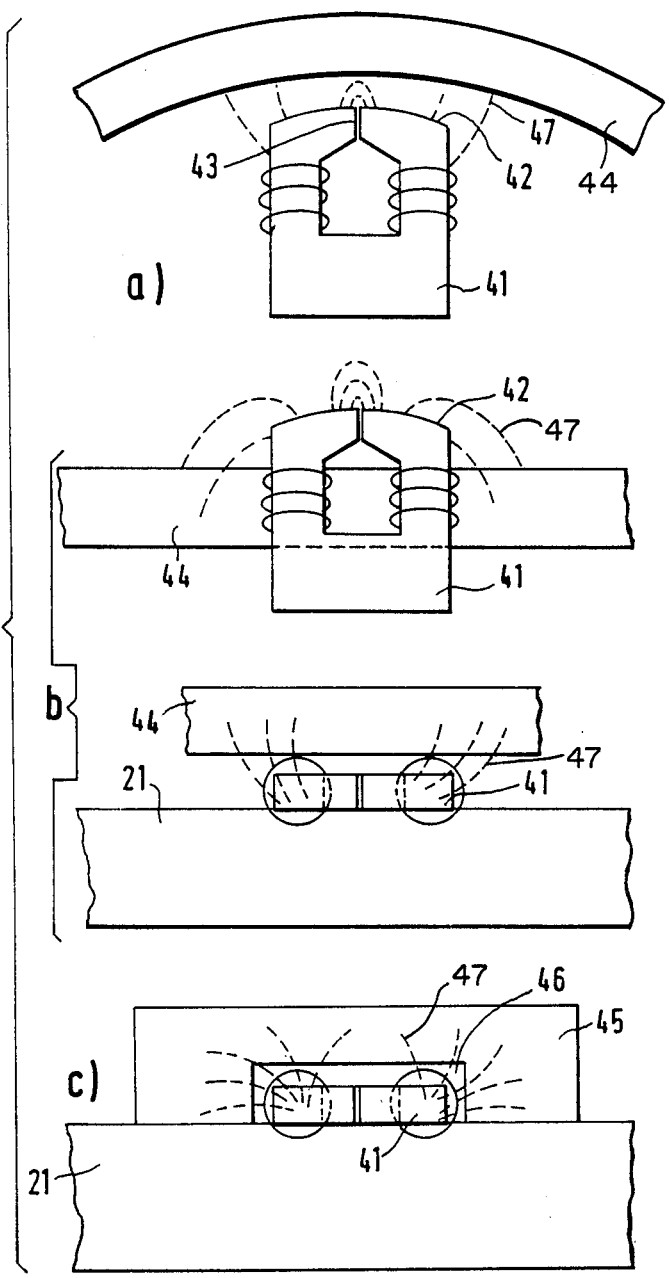
FIGS. 4a, 4b and 4c are various diagrams illustrating the basic principles of the apparatus of the invention.

FIGS. 4a–4d show how a magnetic shunt according to the invention may be provided for extensive suppression of the spread of the stray field 47 that comes out of the recording gap. In FIG. 4a, a strip 44 of a magnetizable material of low remanence is provided adjacent to the working gap 43 arranged in the polished surface 42 of the magnetic head 41. The material of the strip 44 has similar or better magnetic properties with respect to the material of the core of the video magnetic head 41 for the frequency range of interest. The magnetic shunt can for example consist of ferrite, amorphous iron, mumetal or the like.

FIG. 4b which shows a top view (parallel to the axis of the headwheel) and FIG. 4c a side elevation, of the strip 44 constituting a magnetic shunt arranged alongside a magnetic head, rather than in front of it as shown in FIG. 4a. The wheel disc 21 is omitted in FIG. 4b. This arrangement has the advantage that the polished surface 42 of the magnetic head 41 is not covered, so that the running of the magnetic tape is not interferred with.

In FIG. 4d there is shown in side elevation of a the strip which differs from the strip 44 just described by having a cavity 46 for accommodating the magnetic head 41. The magnetic shunt 44 or the shunt 45 can in general be a strip of finite or practically infinite length. It has been found that it is sufficient in many cases when its length is equal to or greater than twice the length of the polished surface 42 of the magnetic head. The magnetic shunt should only slightly affect the useful flux, i.e., the spreading lines going out through the tape and back while crossing the working gap. This can easily be obtained when the spacing of the magnetic shunt from the gap is much greater than the gap width, for example several times the gap width.

By offering to the unavoidable stray flux of the magnetic head a path with distinctly smaller magnetic resistance than the path through a neighboring video magnetic head that would be disturbed thereby, the undesired coupling is substantially reduced. This holds also for a head connected for pickup which might be disturbed. Field lines passing through space which may have sources of a different nature are also picked up by a magnetic shunt and to a great extent can thus be kept away from the magnetic circuit of a playback magnetic head. The reduction of field dispersion can therefore be obtained either by measures at the recording head, at the playback head or at both of them. The greatest effectiveness is obtained when all magnetic heads are equipped with magnetic shunts in accordance with the invention.

In the embodiments shown in FIG. 5 there is shown a drum type scanning device of the kind shown in FIG. 3 in which rings 52 and 53 made of an easily magnetizable material of low remanence mounted on the stationary guide drums 62 and 63 facing the headwheel 51 respectively from above and below. These rings fixed in the stationary parts of the scanning device, inside the drum surfaces and facing the head wheel 5, continuously provide a length of magnetic shunt for the magnetic heads that pass by in the immediate neighborhood of these rings.

In the embodiment of FIG. 6 a horseshoe-shaped body 64 of readily magnetizable material of small remanence is provided as a magnetic shunt for the magnetic heads disposed on the periphery of the headwheel 61. The magnetic shunt 64 can either be fixed, or in order to facilitate the insertion of the magnetic tape 65, it can mounted so that it can be swung away for inserting the tape. FIG. 7 is a top view of the embodiment of FIG. 6 having the magnetic shunt 64 and the tape 65 and makes clear that the strip 64 does not need to extend for much more than 180° around the circumference of the drum 62.

Figure 8:
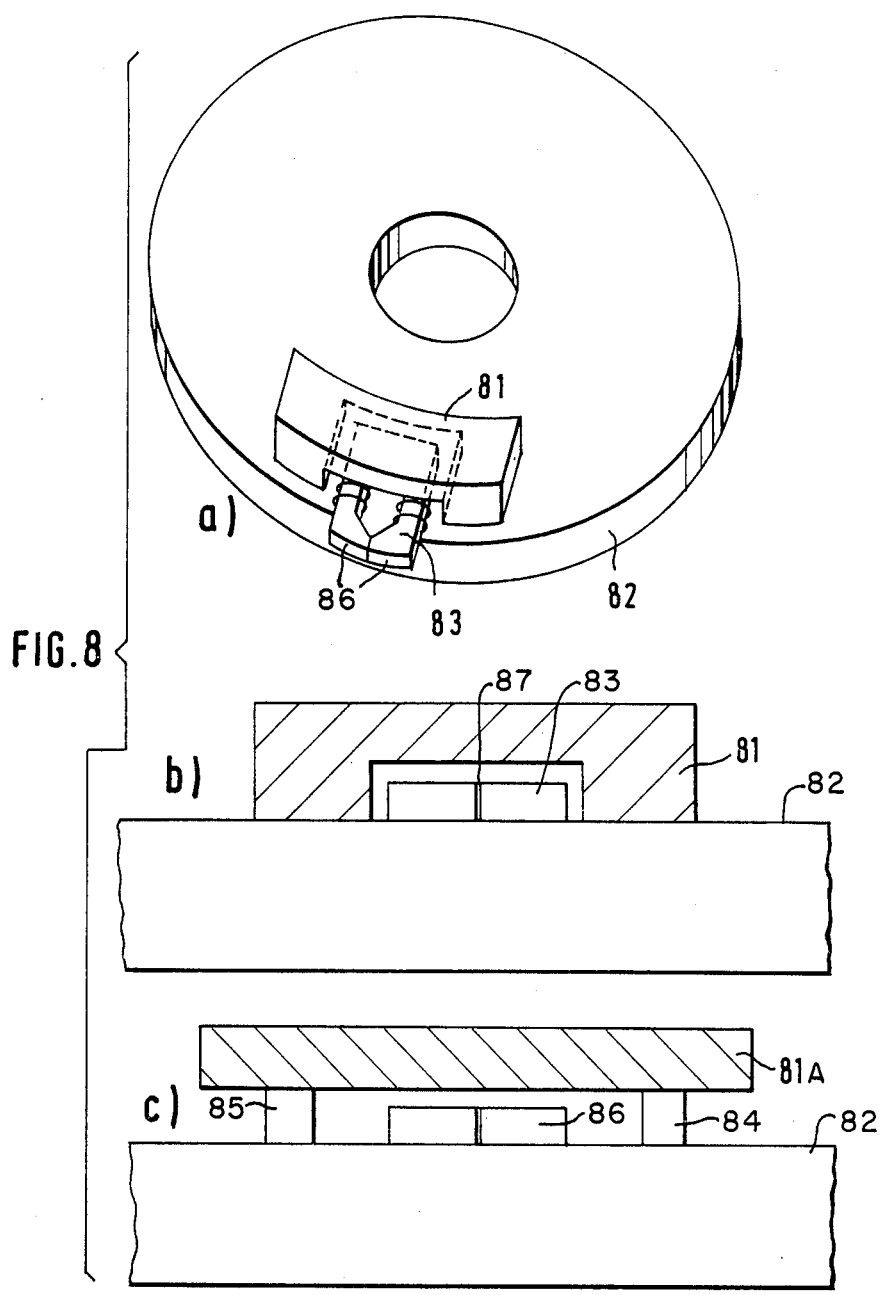
FIG. 8a, and 8b are respectively perspective and sectional views (the latter partly in side elevation) of another embodiment of the invention, showing only a single one of the magnetic transducers of a headwheel.
FIG. 8c shows a modification of FIG. 8b.

FIG. 8a is a perspective view of a single transducer head 83 on a headwheel 82 in a configuration similar to FIG. 4d, as is clear from FIG. 8b which is a side view, partly in section on a magnefied scale. The segment 81 is a bracket or bridge-shaped strip fastened on the headwheel disc 82 in such a way that the magnetic head 83 is laterally shielded.

FIG. 8a shows the polished surfaces 86 of the magnetic head 83, which are arcuate and coaxial with the disc 82. The bracket shaped strip 81 shown in FIG. 8a is also arcuate in its longest dimension when seen from above, and coaxial with the polished surfaces 86.

FIG. 8b shows the working gap 87 of the head 83. The spacing of the strip 81 from the head 83 should be at least several times the width of the working gap 87.

FIG. 8c shows a modification of FIGS. 8a and 8b in which the strip 81A is flat, in contrast with the bracket or bridge shaped strip 81, and is provided with spacers 84 and 85 so that it may bridge the head 83 at a suitable spacing.

Figure 9:
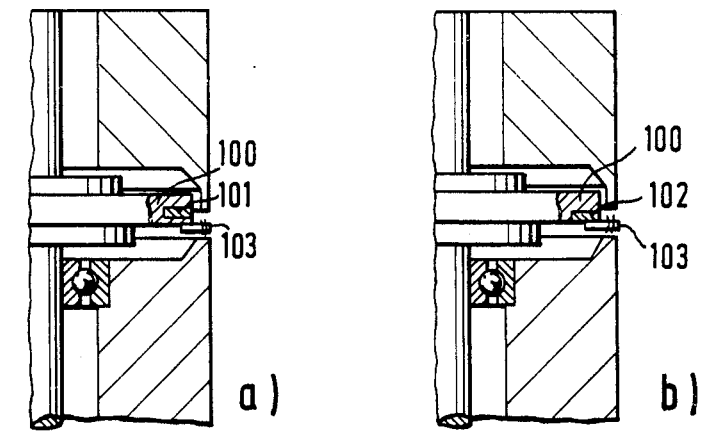
FIG. 9a and 9b show two versions of another illustrative embodiment of the invention, in section.

FIGS. 9a and 9b show still other ways providing the magnetic shunt strips for diverting stray flux of the magnetic heads, in this case by providing flat annular strips embedded in the periphery of the headwheel 100 which carries the heads 103 distributed around the periphery of the headwheel. In FIG. 9a the strip 101 of readily magnetizable material of low remanence is embedded in the periphery of the headwheel at a small spacing from the heads 103, whereas in FIG. 9b, the strip 102 is embedded in the periphery of the headwheel 100 at the edge where the heads 103 are mounted on the headwheel, so that it is in contact with the yoke portion of the core of the heads.

Figure 10:
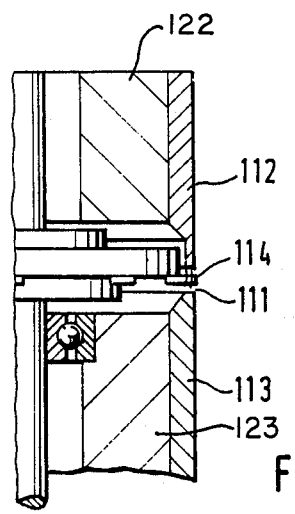
FIG. 10 is a diagram, mainly in section, of still another embodiment of the invention.

FIG. 10 shows still another way of providing magnetic shunts for the revolving magnetic heads for reducing the spreading out of stray flux. In this case, cylindrical outer surface portions 112 and 113 of the stationary guide drums 122 and 123, have the form of shells which together form the annular gap 111 in which the magnetic heads 114 revolve and are made of easily magnetizable material of low remanence, in other words a material having magnetic properties in the useful frequency range which are as good as or better than those of the cores of the magnetic heads. These shells 112 and 113 can extend around the portions of the gap corresponding to the arc covered by the magnetic shunt strip 64 of FIG. 7. It is also possible for the entire stationary guide drums for the magnetic tape to be made of magnetic shunt material.

It will thus be seen that although the invention has been described with reference to a variety of particular embodiments, further modifications and variations are possible within the inventive concept.

We claim:

1. A rotary multiple-magnetic-head device of a recording and/or playback apparatus for scanning magnetic tape records at an oblique angle to the longitudinal dimension of a tape, comprising:
   a rotary disc and a plurality of electro magnetic transducer heads distributed around the periphery of said disc and mounted thereon to revolve therewith;
   means for rotating said disc on its axis in a location coaxially between two fixed coaxial drum objects for said tape having a gap between them wherein said heads of said disc may make contact with said tape while said tape is advanced around at least 180° of said guide drums while said disc rotates;
   a magnetic shunt adjacent to at least one of said transducer heads mounted in position for intercepting the stray field of said at least one head and thereby reducing cross-talk between transducer heads.

2. A device according to claim 1, wherein said heads have arcuate polished surfaces coaxial with said disc and facing outward of said disc and a said magnetic shunt is provided adjacent to said at least one head, said magnetic shunt being made of a strip of readily magnetizable material of low remanence mounted at its ends on said disc and spaced from said at least one head and having its main direction of extension substantially in an arc concentric with said arcuate polished surfaces of said at least one transducer head.

3. A device according to claim 2, in which the length of said stirp is not less than twice the length of said polished surface of said at least one transducer head.

4. A improvement device according to claim 3, wherein the spacing of said strip from said at least one transducer head is at least several times greater than the width of the working gap of said transducer.

5. A device according to claim 4, wherein said magnetic shunt strip (44) is disposed opposite said polished surface of said at least one transducer head.

6. A device according to claim 5, wherein said magnetic shunt is constituted as a circular-segment shaped strip (64) coaxial with said disc and hooking around the portion (62, 63) of said gap between said drum guides useful for scanning said tape.

7. A device according to claim 4, wherein said magnetic shunt strip (44, 45) is disposed laterally with respect to said disc, on the same side thereof as said at least one transducer head (41) and so positioned that a portion of said transducer head is between said disc and the midportion of said magnetic shunt strip and spaced from said strip.

8. A device according to claim 7, wherein a first said magnetic shunt (53) is in the form of a ring inserted and fastened in a first of said stationary guide drums (63) disposed on the same side of said disc (51) as said magnetic heads and having an outer diameter at least approximately equal to the diameter of said disc.

9. A device according to claim 8, wherein a second said magnetic shunt (52) is provided in the form of a ring inserted and fastened in a second of said stationary guide drums (62) disposed on the opposite side of said disc (51) from said magnetic heads and having a diameter at least approximately equal of the diameter equal to the diameter of said disc.

10. A device according to claim 7, wherein said guide drums (62, 63) are, at least near their external cylindrical surface portions adjacent the annular gap between said guide bodies, of a material of low magnetic reluctance and of good magnetic permeability.

11. A device according to claim 10, wherein said guide drums (62, 63) respectively have outer cylindrical shells of material having good magnetic properties (112, 113) fastened to base portions of said guide drums, which shells provide magnetic shunts for said magnetic heads.

12. A device according to claim 7, wherein at least an annular peripheral portion of said disc consists of material having low magnetic reluctance and good magnetic permeability, which annular disc portion constitutes said magnetic shunt.

13. A device according to claim 3, wherein said magnetic shunt strip (81) is mounted on said disc so as to bridge over the transducer for which it forms a magnetic shunt.

* * * * *